Oct. 25, 1932.                J. M. HOTHERSALL                1,884,698
                          CONTAINER ASSEMBLING MACHINE
                    Filed Sept. 21, 1928      7 Sheets-Sheet 1

INVENTOR
John M. Hothersall
BY
John C. Carpenter
ATTORNEY

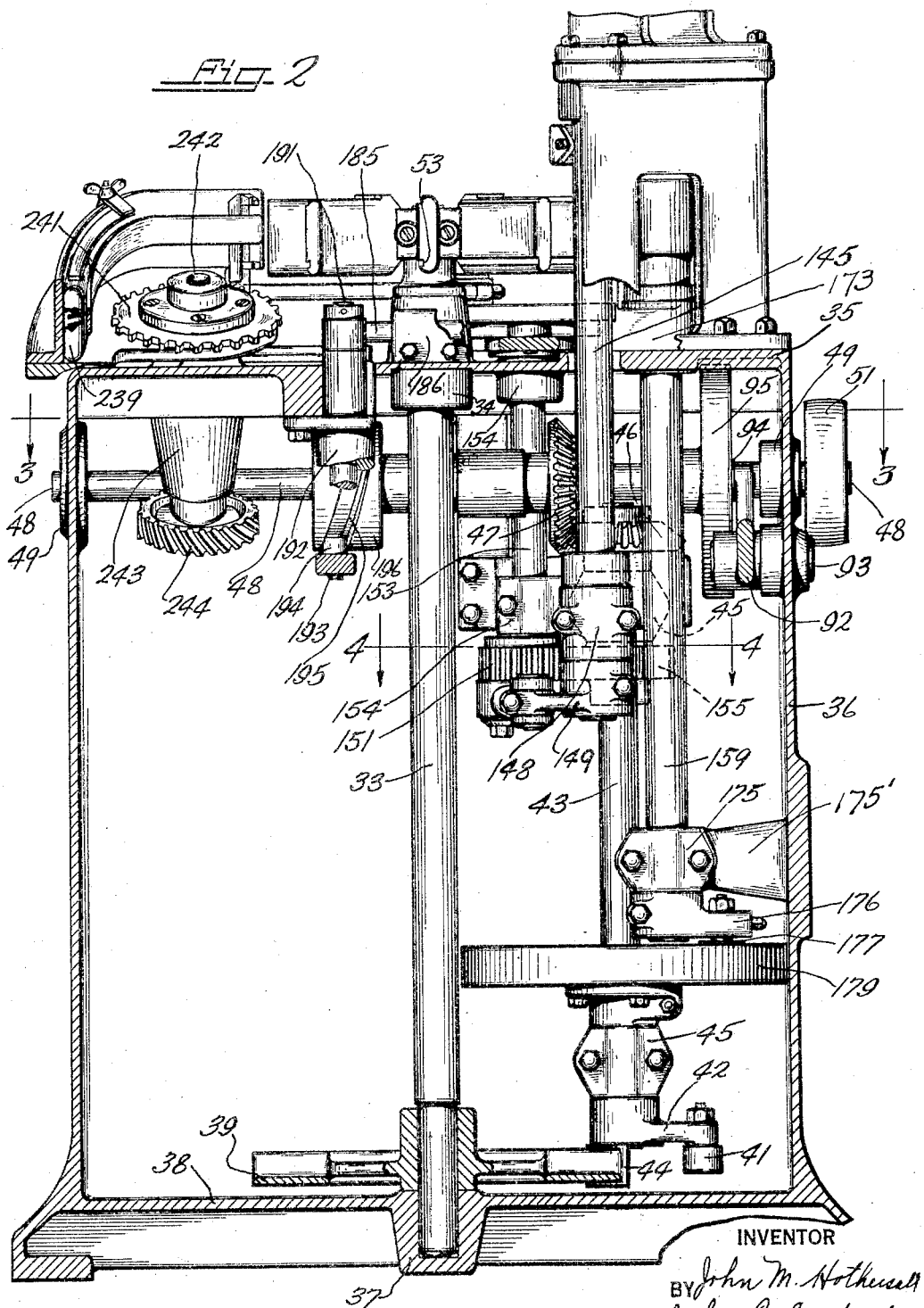

Oct. 25, 1932.   J. M. HOTHERSALL   1,884,698
CONTAINER ASSEMBLING MACHINE
Filed Sept. 21, 1928   7 Sheets-Sheet 3
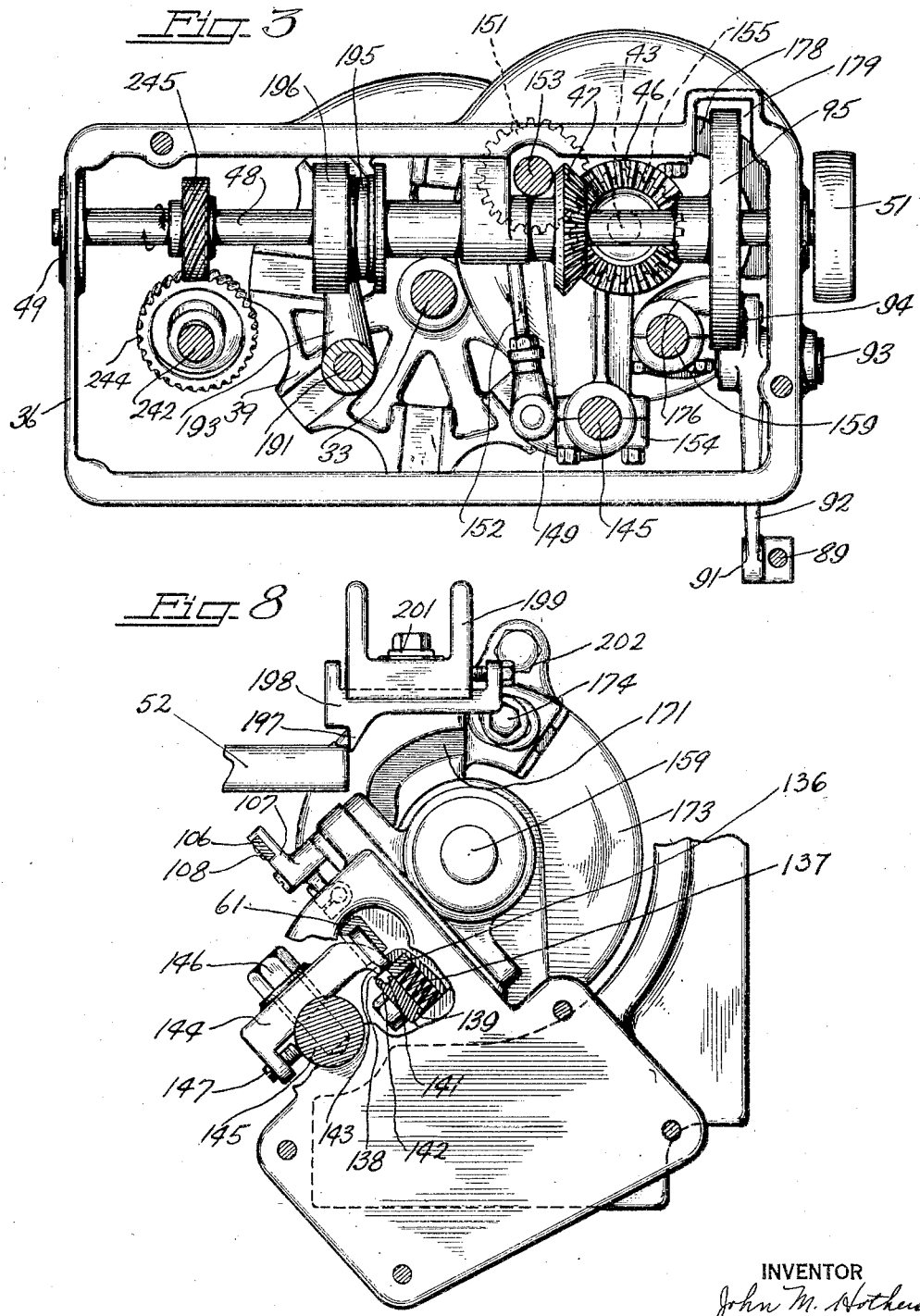

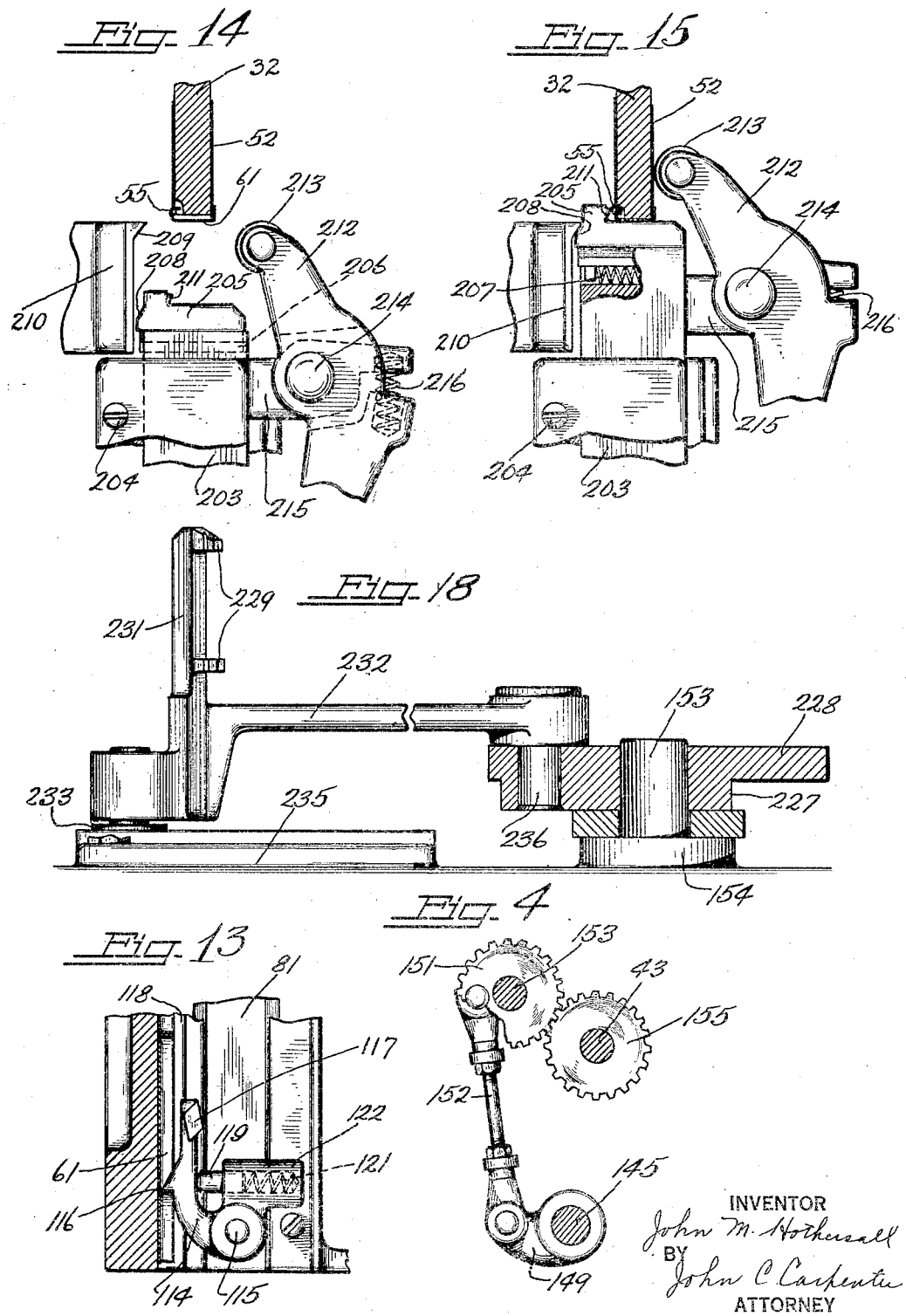

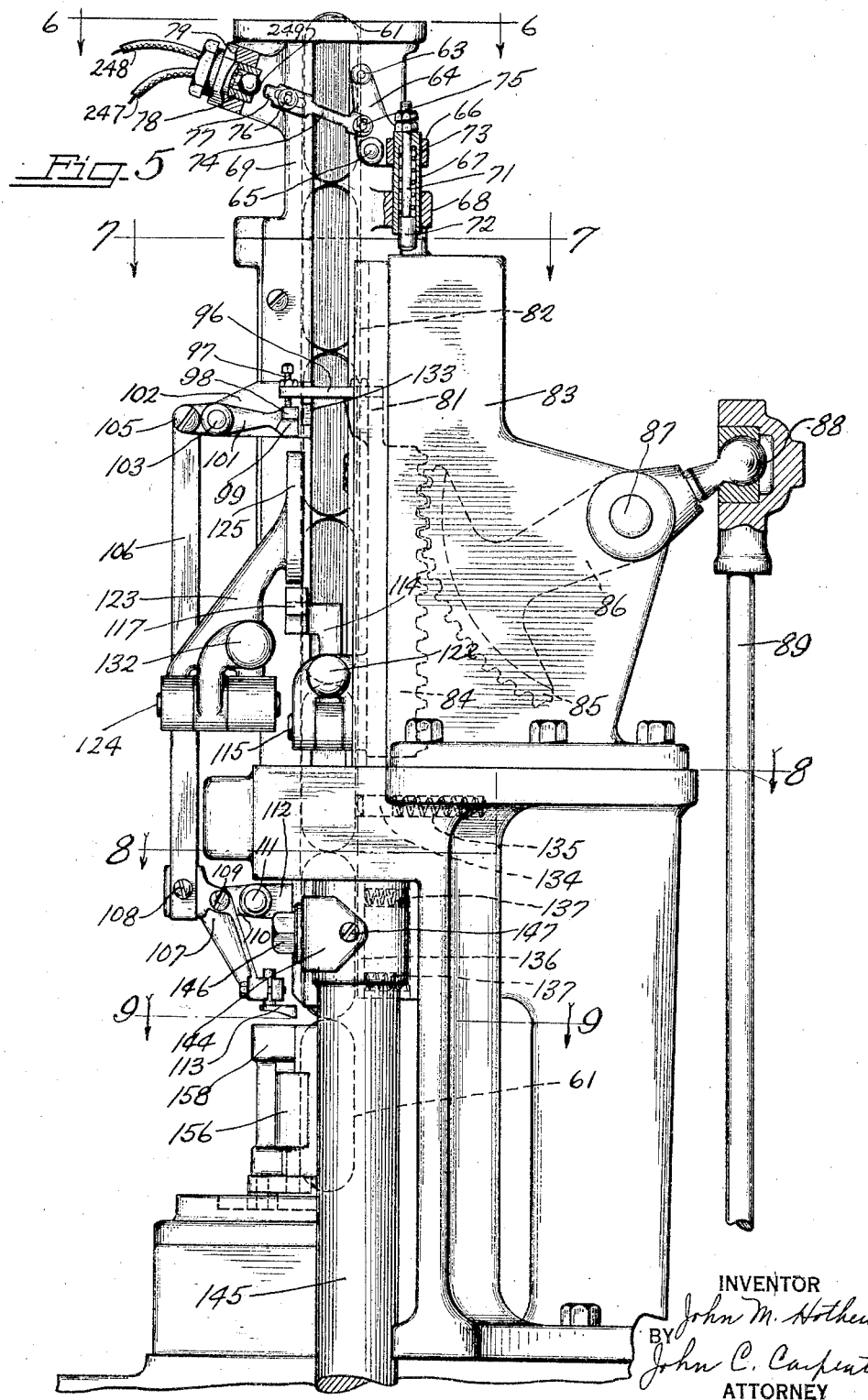

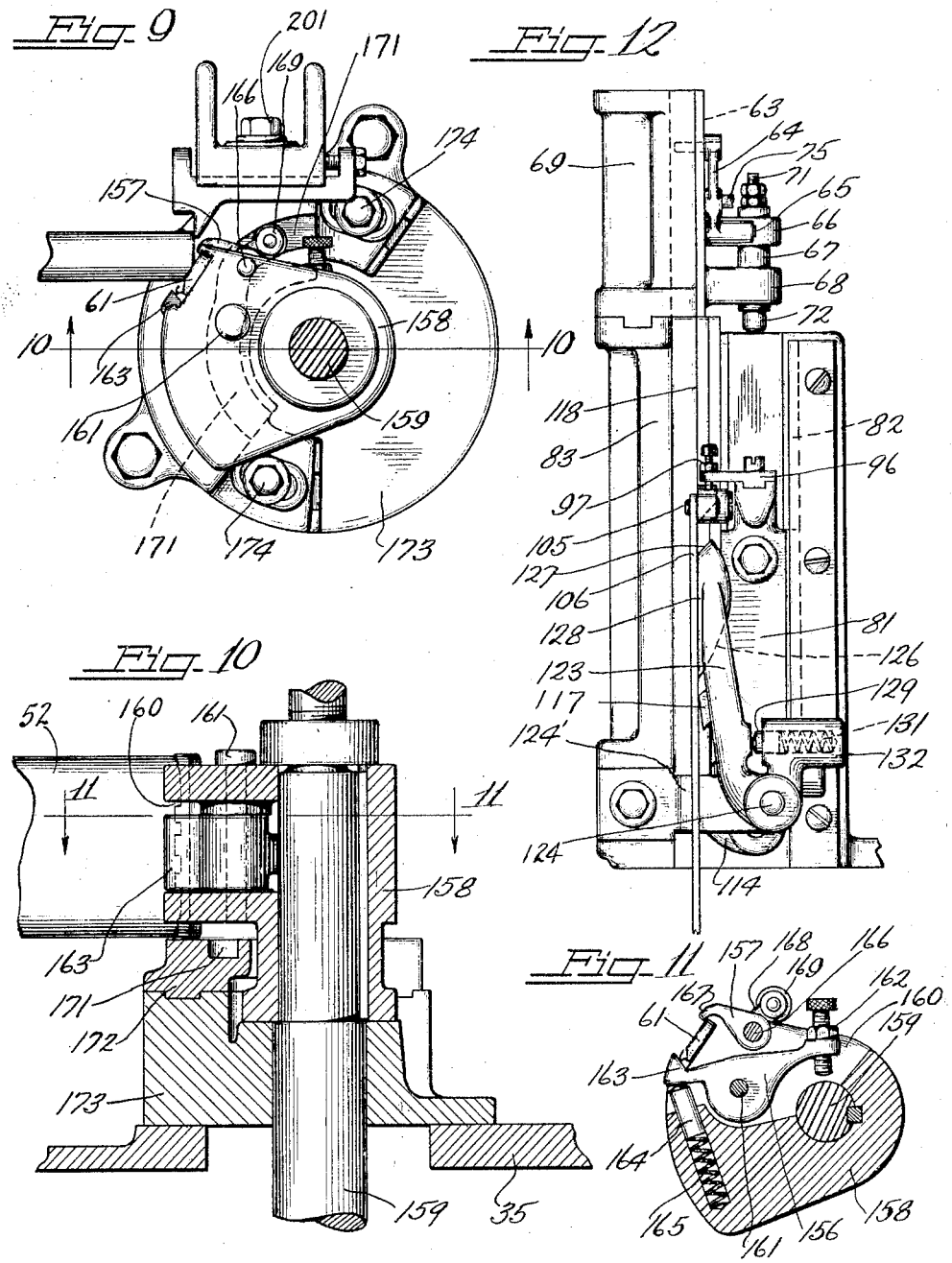

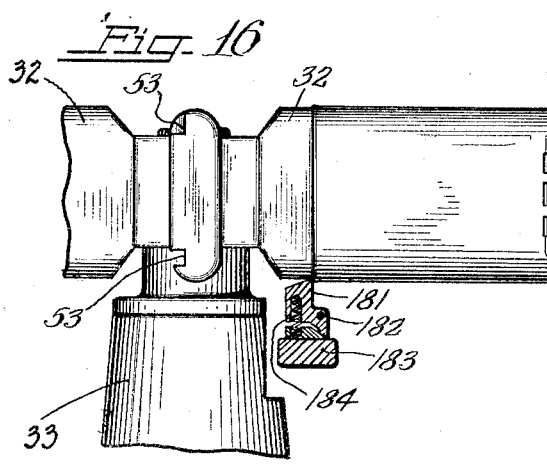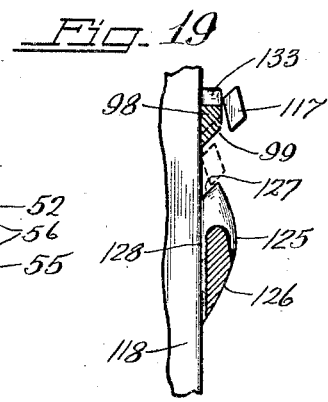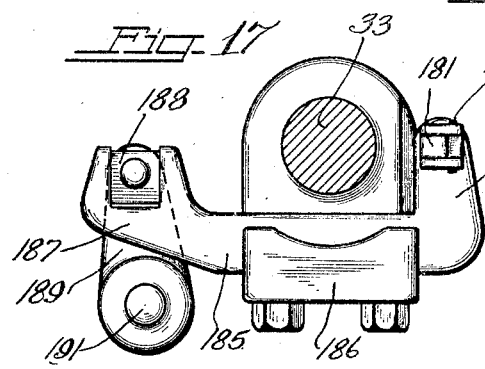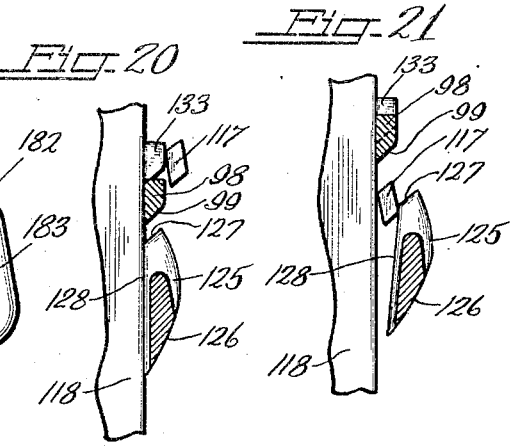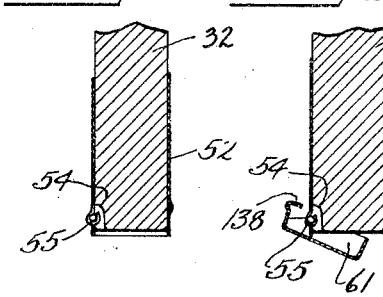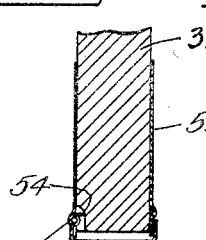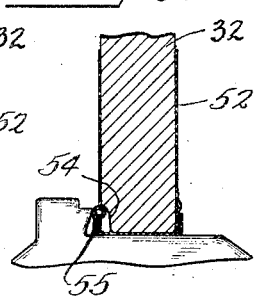

Patented Oct. 25, 1932

1,884,698

UNITED STATES PATENT OFFICE

JOHN M. HOTHERSALL, OF BROOKLYN, NEW YORK, ASSIGNOR TO AMERICAN CAN COMPANY, OF NEW YORK, N. Y., A CORPORATION OF NEW JERSEY

CONTAINER ASSEMBLING MACHINE

Application filed September 21, 1928. Serial No. 307,502.

My invention relates in general to the manufacture of metallic containers and has more particular reference to an improved machine for hingedly assembling a container body with a container cover.

An object of my invention is the provision of an improved automatic machine of the turret type which is adapted to receive metallic tobacco box bodies with hinge pintles in place therein and metallic tobacco box covers with hinge ear blanks therein and to assemble the bodies with the covers and complete the hinge connection.

Another object of my invention is to provide such a machine wherein is embodied a device which will prevent the feeding of container bodies if the feeding of container covers should be interrupted.

Another object of my invention is the provision of a tobacco box and cover assembling machine containing a device which will prevent the feeding of covers in case the feeding of bodies should be interrupted.

Numerous other objects of the invention will be apparent as it is better understood from the following description, which, taken in connection with the accompanying drawings, discloses a preferred embodiment thereof.

In general my improved automatic container assembling machine comprises a turret having intermittent motion and carrying a number of radially arranged spindles or mandrels adapted to receive partially formed, bottomless tobacco container bodies from a body-forming machine positioned in advance of this assembling machine. When the bodies are placed on the mandrels they already carry a pintle upon which the cover is to be hinged. The mandrels carry the bodies to a mechanism which places a partially formed cover on the pintle of each body.

Another mechanism changes the form of the cover by partially bending the straight hinge lugs of the cover to engage the pintle of the body. The mandrel as it continues its circular path of travel, carries the loosely assembled body and cover to a mechanism which clinches the hinge lugs on the cover about the pintle by moving the body and cover axially along the mandrel, thus completing the hinge connection. Further travel of the mandrel brings the assembled body and cover to a positive discharge mechanism which strips the container from the mandrel and positions it within a suitable mechanism to convey it to other machinery where other operations are to be performed.

Referring to the drawings:

Fig. 2 is a vertical cross-sectional view of the lower part of the machine showing the various driving mechanisms.

Fig. 3 is a horizontal sectional plan view of the driving mechanism taken substantially along the line 3—3 of Fig. 2.

Fig. 4 is a detail view of a part of the driving mechanism taken substantially along line 4—4 of Fig. 2.

Fig. 5 is a side elevation view of the cover re-forming and feeding device.

Fig. 8 is a horizontal partial plan and partial sectional view of the cover lug bending mechanism along line 8—8 of Fig. 5.

Fig. 9 is a horizontal cross sectional view taken along line 9—9 of Fig. 5 showing the cover transfer mechanism.

Fig. 10 is a vertical cross section taken along line 10—10 of Fig. 9.

Fig. 11 is a horizontal cross section in detail taken along line 11—11 of Fig. 10.

Fig. 12 is an end elevation of portions of the mechanism shown in Fig. 5.

Fig. 13 is a view similar to that shown in Fig. 12 showing details of portions hidden in Fig. 12.

Fig. 14 is an enlarged fragmental plan view of the portion of the mechanism which completes the lug clinching operation.

Fig. 15 is a similar view with parts cut away, showing the operating parts in different positions.

Fig. 16 is a part cross-sectional elevation showing the mechanism to properly position the can body on a mandrel of the turret.

Fig. 17 is a partial plan view of the same showing the other parts of the mechanism.

Fig. 18 is a part cross section, part elevation, showing portions of the positive discharge mechanism.

Figure 1:
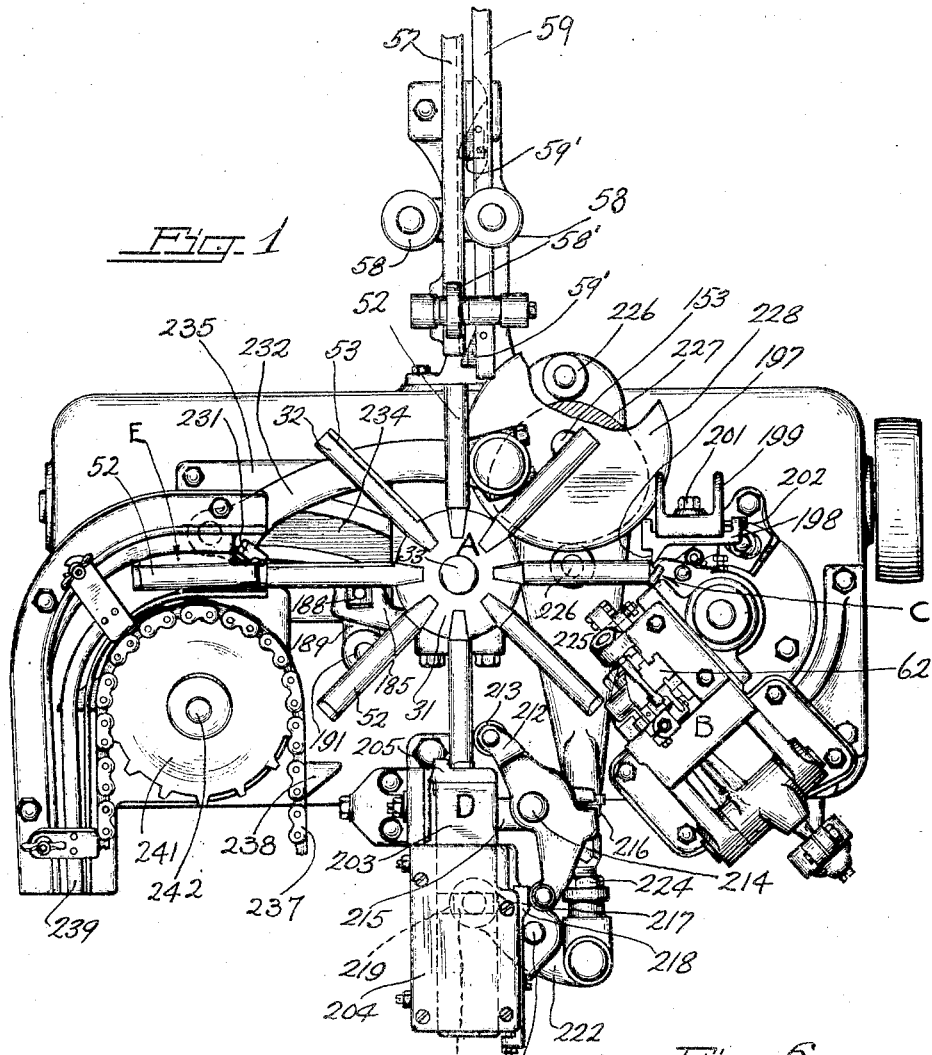
Fig. 1 is a top plan view of the machine embodying my invention.
Figure 7:
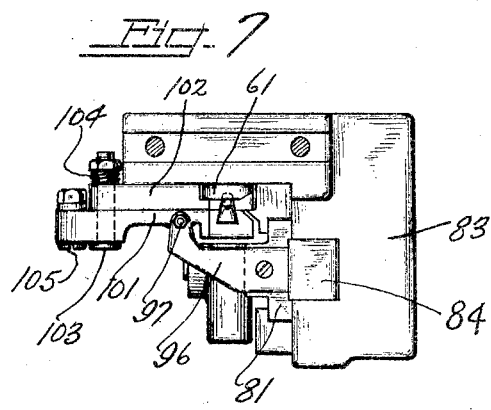
Fig. 7 is a horizontal cross-section taken along line 7—7 of Fig. 5 illustrating a portion of the cover feeding chute below the portion shown in Fig. 6.

Figs. 19, 20, and 21 are schematic detail views showing the operation of certain parts of the cover feeding mechanism.

Figs. 22, 23, 24, and 25 are schematic detail views showing various steps showing the assembly of can and cover.

Referring now to the drawings in more detail, wherein I have shown a preferred embodiment of my invention, and wherein the same reference numerals designate the same parts throughout, for the sake of clarity and brevity of description, I have divided the machine roughly into five sections, but it will be readily apparent that there will be considerable overlapping between the parts of the various sections.

The first section I have designated as the body conveying mechanism or intermittent turret feed A.

The second section, the cover feeding and cover lug pre-forming mechanism B.

The third section, located between the first and second section, I have designated as C. It comprises the body and cover assembly station.

The fourth or cover lug clinching station I have designated as D.

And the fifth or discharge station I have generally marked E.

*Body carrying mechanism or turret A*

The body carrying section A, comprises a turret 31, carrying a plurality of body supporting horns or mandrels 32, radially extending from the center of the turret. This turret 31 is given intermittent rotary motion through a Geneva wheel, the mechanism of which is clearly shown in Figs. 2 and 3. The turret 31 is mounted upon the upper end of a vertical shaft 33 which is journalled in an upper bearing 34, formed in the top portion 35 of a supporting frame and gear housing 36, and in lower bearing 37 formed in the base 38 of the gear housing. The Geneva wheel 39 is secured to the shaft 33 just above the lower bearing 37 and is actuated by a roller 41 carried on a Geneva arm 42 mounted at the lower extremity of a vertical shaft 43. A block 44 is carried by the Geneva arm 42 to lock the wheel 39 after each step motion. The shaft 43 is journalled in upper and lower bearings 45 and carries a bevel pinion 46 on its upper end. This pinion meshes with a bevel gear 47 on a horizontal shaft 48 which is the main drive shaft of the machine, being journalled in bearings 49 in the side walls of the housing 36 and receiving its power through a pulley 51.

Each turret mandrel 32 has a shape similar to that of the can body 52 and has a pair of parallel slots 53 cut longitudinally on one side. (See Figs. 1 and 16.) At the end of each mandrel and on the same side as the slots 53 a curved recess or curling die 54 is formed, adapted to complete the assembly of a can and cover in a manner to be more fully described hereinafter.

As the can body 52 is fed to the turret mandrel form a body forming machine (only partially shown) the bottom has not yet been assembled, but a hinge pintle 55 has been placed in ears 56 formed in the top of the can body 52, opposite the bottomless end of the body.

In operation, the can body 52 is fed from a body forming machine (partially shown in Fig. 1) to the assembling machine, bottom first, over a bodymaker horn or mandrel 57, the forward end of which terminates adjacent one of the turret horns 32 and is in horizontal alignment therewith when the turret is momentarily at rest. The bodymaker horn 57 is supported and held against displacement by means of horizontal rollers 58 and vertical rollers 58' (only one vertical roller 58' being visible in Fig. 1). These rollers are mounted in a frame part of the bodymaker machine. The can bodies 52 are fed over the horn 57 in a step-by-step movement in timed relation with the turret 31 by means of a reciprocating feed bar 59 carrying spring-pressed feed dogs 59' which engage behind the can body 52 and move it forward on each stroke of the bar 59, until the last dog 59' pushes the body 52 from the bodymaker mandrel 57 over onto one of the turret mandrels 32 which temporarily dwells in horizontal alignment with the mandrel 57 to receive the can body 52. Under the actuation of the Geneva wheel 39 the turret 31 rotates with an intermittent motion. During this rotation each turret mandrel 32 is successively presented to eight different positions or stations, at four of which certain positive operations are performed, the other four being idle stations. At the first station adjacent the delivery end of the bodymaker mandrel 57 a can body 52 is positioned upon the turret mandrel 32. The next motion of the turret brings the can body 52 upon the mandrel 32 to the first idle station. Another step motion brings the can body 52 upon the mandrel 32 to station C, where the body 52 meets a cover and where the two are assembled. Further step rotation of the turret 31 past station B of the machine brings the body 52 upon the mandrel 32 to a second idle station. Still further step motion of the turret 31 brings the can body 52 upon the mandrel 32 to section D of the machine where the clinching of the cover lugs about the body pintle is completed. After another dwell at the third idle station the can body 52 upon the turret mandrel 32 is brought to station E of the machine where the assembled body and cover are positively ejected.

Still further rotation of the turret 31 brings the now empty mandrel 32, after another dwell at a fourth idle station, in alignment with the bodymaker horn 57 to receive another can body 52 and then the cycle of operation is repeated.

Positive Timed Cover Feeding and Lug Bending Device

*Station "B"*

The cover feeding and cover lug bending device in general consists of a vertical chute down which the covers are drawn by a positive action, a mechanism to bend and shape the straight pintle engaging ears or lugs formed on the cover and a mechanism to convey the formed covers from the chute to meet an advancing body at station C and partially assemble the cover to the body. Auxiliary mechanisms are also provided in connection with the feeding mechanism to insure covers being fed to the body and to prevent feeding of bodies from the bodymaker if no covers are available.

Figure 6:
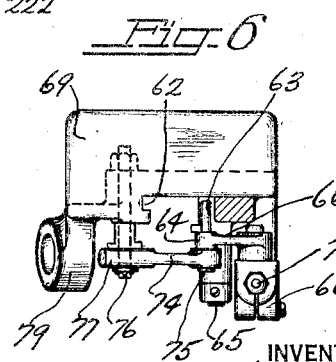
Fig. 6 is a top plan view taken along line 6—6 of Fig. 5, illustrating the hinge cover chute and details of the no-cover-no-body device.

Referring now to Fig. 5 the covers 61 enter the top of a chute 62 which extends downwardly to within a short distance of the top 35 of the casing 36. The covers upon entering the chute are fed past a detector device which in the event of no cover being present in the chute at that particular point, closes an electric circuit and stops the feeding of further can bodies from the bodymaker horn 57. This detector device consists of an electric circuit (not shown) connected with the mechanism for the feeding of formed can bodies along the horn 57 and a secondary or shunt circuit leading to the detecting device which will now be described. The electric circuit in connection with the operation of the bodymaking machine is not shown. However, the feeding of can bodies along the horn 57 can be stopped by a number of suitable means such as electro-magnetic means which can be shorted by the closing of an auxiliary circuit. This auxiliary circuit is connected with the detecting device by two lead wires 247 and 248 which enter a switch box 79 formed in a side wall of the casing 69. Contact between the terminals of the wires 247 and 248 in the switch box 79 is made by means of a ball 249 slidingly movable in a cylindrical casing 78, which ball 249 under the action of gravity normally rests in a position disconnected from the wires 247 and 248. As shown in Figs. 5 and 6, the cover detecting device consists of a lever arm 64 pivoted at 65 to the casing 69 and carrying at its outer extremity a pin 63 which projects into the line of travel of the can covers 61 in the chute 62 when no cover is in the chute at that point and which is held in an outward position toward the right, as viewed in Fig. 5 by the presence of a can cover 61. When in this outward position the arm 64 holds an actuating rod 74 pivoted thereto at 75 with its extremity 77 out of contact with the ball 249. The forward end of the arm 74 is slidably connected at 76 to the casing 69. The lever arm 64 is also provided with an extension carrying a knuckle 66 surrounding the upper end of a sleeve 67. The lower end of the sleeve moves at a certain period within the bearing 68 formed in the side of the casing 69 and the sleeve 67 in turn carries a sliding pin 71 projected through the upper end of the sleeve 67 and formed with an enlarged head 72 at its lower extremity. A coil spring 73 is interposed in a recess between the upper end of the sleeve 67 and the head 72 and tends to hold the latter extended downward beyond the end of the sleeve 67. During certain movements of the cover feed mechanism, which will hereinafter be more fully described, the end of the head 72 is engaged and lifted and this action tends to move the lever 64 about its pivot point to carry the pin 63 toward the left as viewed in Fig. 5 and to make contact with the wires 247 and 248 by means of the contact ball 249 which is also moved toward the left by the rod 74. If a can cover 61 is positioned within the chute 62 the arm 64 is prevented from moving about its pivot point 65 and a full stroke of a rising part of the cover feed mechanism (hereinafter more fully described) moving against the head 72 lifts the pin 71, and against the action of the spring 73 moves the pin 71 longitudinally of the sleeve 67, which at that time is prevented from upward movement by the pin 63 riding against the edge of the cover 61. When however, there is no can cover 61 present to stop the movement of the pin 63 toward the left and the head 72 of the pin 71 is engaged and lifted, the arm 64 is moved and the rod 74 is slid towards the left into contact with the ball 249 forcing the latter to close the electric circuit through the wires 247 and 248.

The positive cover feed mechanism as shown in Figs. 5, 7, 12, 13, 19, 20 and 21 consists in general of a slide bar carrying a feed finger which engages a flange in the cover to move the covers downward through the chute 62, a distance equal to the length of each cover as the lowermost cover in the chute is removed to the assembly station. Closely allied to this mechanism is a cooperating device to prevent such a feed of covers in the event that the lowermost cover is not removed from the chute to the assembly station. It is believed that the action of this mechanism can be best understood by first giving a detailed description of the mechanism and then tracing it through one complete cycle of operations.

A slide bar 81 (Fig. 5) is held in grooves 82 in a casing 83 and has a rack 84 formed on its back face, a gear segment 85 meshing with the rack to actuate the bar. An arm 86 of the segment is pivoted at 87 to the casing 83 and is motivated by a rod 89 through a ball and socket joint 88. The other end of the rod 89 is pivoted at 91 to an arm 92 (Fig. 3), which in turn is pivoted at 93 to the side walls of the housing 36. The other end of the arm 92 carries a cam track roller 94 engaging a cam track groove in a cam 95. This cam 95 is mounted upon and rotated by the main drive shaft 48 and in rotating gives the arm 92 an oscillatory motion.

At its upper end the sliding bar 81 carries a projecting plate 96, at one end of which a stop set screw 97 is mounted, the set screw actuating a cam block 98 formed with a cam face 99. The cam block 98 is part of an arm 101 pivoted at 103 to a bracket 102 projecting from the casing 83, a coil spring 104 (Fig. 7) serving to provide tension between the arm and bracket to give frictional engagement therebetween. The other end of the arm 101 is pivoted on a bolt 105 to a bar 106 extending vertically downwardly, the bar being firmly secured in a slot in another arm 107 by a bolt 108. The arm 107 is pivoted at 109 to a short lever 110, which is turn is pivoted at 111 to a bracket 112 extending from the casing 83. At one end the arm 107 carries a foot 113 whose action and function will be explained later.

Near its lower end the slide bar 81 carries a finger 114 (Figs. 5 and 13) pivotally connected thereto by a pin 115. This finger carries a projection or hook 116, adapted to engage the flange of a cover 61 to pull it downwardly through the chute, and also carries a cam 117, the cam being formed at one end of the finger. The cam 117 normally rests against a face plate 118 being urged in that direction by a plunger 119 actuated by a spring 121 carried in a spring barrel 122.

In connection with the no-feed device which comes into operation when it is not desirable to remove a cover 61 at the bottom of the chute 62 (Figs. 5, 12, 19 and 21) a cam bar 123 is pivotally mounted at 124 upon a bracket 124' extending from the casing 83 and carries a cam block upon which two cam faces 126 and 127 are formed. A flat face 128 of the block 125 is provided to rest against the face plate 118, the cam bar being urged to assume this position under the action of a plunger 129 and a spring 131 mounted in a spring barrel 132. A block 133 is provided upon the face plate 118 to hold the cam 117 away from the plate at the extreme upper end of its path of travel, the block 133 being positioned adjacent the cam 99 previously described. It should be noted that the cam blocks 98, 125 and 133 are all positioned within the path of travel of the cam 117.

In operation, as the slide bar 81 reaches its lowest position, carrying with it the feed finger 114, which lowers the whole stack of covers in the chute 62 by the length of one cover, the lowermost cover in the chute is placed within a carrier to be described later, which carries the cover to the body and cover assembly station C. At the same time, the set screw 97 on the plate 96 acts upon the cam block 98 to bring it to a lowered position, and the foot 113 is raised sufficiently to clear a cover being moved by the cover carrier which operates just beneath the foot 113.

As the bar 81 moves on its upward stroke, the cam 117 first comes in contact with the cam block 125 and rides on the cam face 126. This permits the hook 116 to ride past the flange of a cover 61 next above that just previously engaged. As the cam 117 clears the block 125, it drops against the cam 99 on the block 98 and gives the block a vertical upward movement. This vertical upward movement rotates the arm 101 and due to the linkage causes the foot 113 to be lowered so as to be within the path of a cover in the carrier. The cam 117 passes on after riding over the cam 99 and comes to rest upon the raised block 133. As the bar 81 reaches this top position, it comes in contact with the enlarged portion 72 on the rod 71 of the cover detector previously described and tends to lift the sleeve 67 against the spring pressure 73 and at the same time to close the switch 78. However, the presence of a cover 61 in the chute 62 halts the movement of the pin 63 and prevents the closing of the switch, the spring 73 in the sleeve taking up the movement in the usual well-known manner.

By the time the bar 81 is ready to commence its downward movement, the cover carrier has returned to its position below the chute to receive another cover. If the carrier has failed to deliver the cover previously received at station C it will bring the cover back with it in a manner to be described in detail later and further feeding of covers is not desirable. As the carrier returns, if carrying a cover, the cover engages beneath and raises the foot 113, causing the cam block 98 to be lowered. If the carrier returns empty, the foot 113 is not disturbed and the cam block 98 remains in the upward position given by the upstroke of the bar 81.

As the bar 81 moves downwardly, the cam 117 leaves the raised block 133 and rides over the cam block 98. If another cover is to be fed, the cam 117 rides down over the cam 99 onto the face plate 118 engaging the cam 127 and passing between the flat face 128 of the cam block 125 and the face plate 118, swinging the arm 123 out of the way against the force of the spring 131. (See Figs. 19 and 21.) This action allows the hook 116 on the finger 114 to engage the flange of another cover and drag it down with the bar to the end of the stroke. However, if another cover is not to be fed, the cam 117 rides over the lowered cam block 98 and onto the cam 126 of the cam block 125, (see Fig. 20) and since the cam 117 is held away from the face plate 118 the hook 116 is prevented from engaging a cover flange.

The action of these three cams is clearly shown in Figs. 19, 20 and 21, Fig. 19 showing the upstroke action and Figs. 20 and 21 showing the two possible downstroke actions. As the bar reaches its lowest position, the cycle is completed. While the hook 116 is pulling a cover 61 downwardly through the chute, the cover immediately beneath the one actively being pulled is engaged by a plunger 134 backed by a spring 135 and is frictionally retarded in its downward travel, at the same time pushing the cover ahead of it further down and into the receiving pocket of the cover transfer mechanism yet to be described.

It is to be noted that the covers 61 are fed into this cover feeding chute 62 with the pintle ears blanked but not formed; that is, the ears extend as straight projections from the flange of the cover and are not bent. This feeding device or chute 62 has associated therewith a mechanism which is designed to give these ears an initial bend as a part of the feeding process. The mechanism for accomplishing this is located immediately below the spring-pressed plunger 134 just described and above the carrier or transfer mechanism previously mentioned and shown in Figs. 2, 3, 4, 5, and 8.

After a cover 61 passes the plunger 134, it is engaged by a plunger plate 136 forming a portion of one side of the chute, the plate being backed by springs 137, thus frictionally holding the cover in place in the chute in its downward step-by-step travel. This brings the ears 138 within the parts of a lug re-forming die.

This die (Fig. 8) consists of a fixed die plate 139 adjacent the chute 62 and an oscillating die member or arm 144. The plate 139 has a recess 141 and a projection 142 adjacent thereto, the recess and projection co-operating with a tongue 143 on the arm 144 to re-form the straight ears or pintle lugs 138 on the cover, giving them a shape which adapts them to partially engage the pintle 55 in the can body 52. The movable arm 144 is adjustably mounted on a rock shaft 145 (Figs. 4, 5, and 8) by a bolt 146 and a set screw 147. The rock shaft 145 is journaled in bearings 148 and carries a link arm 149 (Fig. 3) which is attached to a crank gear 151 by a link 152. The crank gear 151 is mounted upon a shaft 153 journaled in bearings 154 and meshes with a gear 155 mounted upon the shaft 43 driven from the main drive shaft 48, as previously described. This continuous rotation of the shaft 153 gives the shaft 145 an oscillatory motion to operate the die parts for re-forming the ears or lugs 138 to the shape shown in Fig. 23 and to move the die member 144 out of the path of travel of the cover 61 after its temporary dwell at the lug bending station.

COVER POSITIONING MECHANISM
"Station C"

As the sliding bar 81 moves downwardly it causes the cover to be moved past the pressure plate 136 and out of the bottom of the chute 62 into a properly aligned cover carrier or transfer mechanism 158 which conveys the cover from the chute feed B to the body and cover assembly station C where a body 52 on a turret mandrel 32 has arrived in timed relation with the cover carrier, and where the partially formed ears 138 of the cover are engaged with the pintle 55 of the can body 52 as seen completed in Figs. 24, 25. The construction of this cover conveying mechanism is best shown in Figs. 5, 9, 10, and 11 and its operation in Figs. 22, 23, and 24.

As a cover 61 drops from the lowermost end of the chute 62, which terminates just below the pressure plate 136 of the lug re-forming station, into the properly aligned cover transfer mechanisms, it is engaged between pivoted grasping arms 156 and 157 mounted in a recess 160 (Fig. 11) in an oscillating, turning or swinging arm member and carrier 158 (Fig. 11), which is keyed upon a shaft 159 journaled at one end in a bearing 175 in a bracket 175' (Fig. 2) extending from the frame wall 36 and at the other end in a bed plate 173. At its lower end the shaft 159 carries an arm 176 (Fig. 2) which in turn carries at its end a cam roller 177. This roller operates in a cam groove 178, in a cam plate 179, mounted upon the shaft 43 and transmits an oscillatory motion to the shaft 159 and the arm 158. The arm 156 is mounted upon a pin 161 extending through the drum and carries at one end a stop set screw 162, a shoulder or jaw 163 being formed at the other end. This shoulder or jaw actively engages the hinge lug side of a cover 61, being subsequently released therefrom by the action of applying the cover to the body. The arm 156 is urged in a clockwise direction (Fig. 11) by a plunger 164 and a spring 165, this movement being limited by a set screw 162 adapted to come in contact with the shaft 159.

The arm 157 is pivoted upon a pin 166 extending through the drum 158 and has a shoulder or jaw 167 which actively engages the side of the cover 61 which is opposite to the hinged lug side. This arm carries a second arm 168, which in turn carries a cam roller 169, the roller operating in a cam track groove 171 (Figs. 9, 10) cut in a cam plate 172 and so governs the position of the arm 157. The cam plate 172 is adjustably screwed to the bed plate 173 by bolts 174, the adjustment facilitating the correct timing of the action of the arm 157.

When the carrier is in properly aligned position to receive a cover from the chute 62, the set screw 162 rests against the shaft 159 and the arm 157 is held out of the way of the cover by the cam roller 169 in the cam track 171, so that a cover 61 can drop down between the shoulders or jaws 163 and 167. As the cover carrier moves away from that position, the shoulder 167 on the arm 157 is brought into engagement with the cover and so remains until the cover is in position on the body, that is to say, until the partially bent cover lugs 138 have engaged the pintle 55 of the can body 52 (Figs. 23, 24), which is carried upon a mandrel 32 of the intermittently rotatable turret 31 to meet the cover at the assembly station C.

In order for the carrier just described to function properly, it is necessary that the can bodies 52 be accurately positioned upon the mandrels 32 and I provide a mechanism to accomplish this. This mechanism is designed to operate just as a mandrel 32 comes to rest at the cover-receiving position or assembly station C. At such time the edge of the open bottom of the can body is engaged by a dog 181 (Figs. 16 and 17) pivoted upon a pin 182 carried at one end of an arm 183, which is disposed just beneath the mandrel 32. The dog 181 is constantly urged to rotate in a clockwise direction (Fig. 16) by a spring 184. The arm 183 is part of a slide bar 185 operating in a guide member 186 secured to a portion of the bearing 34 for the shaft 33 which operates the turret 31. The other end of the bar 185 has an arm 187 formed as a yoke to embrace a block 188 pivoted upon an arm 189 which is secured upon the upper end of a rock shaft 191. This rock shaft is journaled in bearings 192 formed in the top 35 of the gear housing 36 and carries at its lower end a cam arm 193 upon which is mounted a cam roller 194. (See Fig. 2.) The roller operates in a cam groove 195 in a cam 196 mounted upon the main drive shaft 48. This imparts a reciprocating motion to the slide bar 185 and hence to the dog 181.

The dog 181, being in engagement with the bottom edge of the can body 52, moves it longitudinally along the mandrel 32 until the top of the body is stopped against a shoulder 197 on a stop gauge 198 (Fig. 8) adjustably held in a bracket 199 by a cap screw 201 and a set screw 202. Further movement of the body is prevented, but the spring 184 allows the dog to give and the bar 185 may thus complete its travel. A can body 52 in this position is shown in Fig. 22.

Figs. 23 and 24 show diagrammatically the action of putting the cover on the can. The cover carrier, previously described, brings the cover to the position shown in Fig. 23. As the mandrel 32 moves away from the cover receiving position, it moves to the left (Fig. 23), while the cover in the carrier remains stationary. This hooks the ears 138 behind the pintle 55 and closes the cover onto the body (Fig. 24), but the ears are not fully clinched about the pintle. During this action, the arm 156 is rotated out of the way in a counter-clockwise direction, as seen in Fig. 11, the engaged lugs pulling the cover from the carrier. It can be readily seen, therefore, that the body removes the cover from the carrier by the rotation of the mandrel and that if no body is present, the cover will not be released from the carrier.

*Hinge clinching mechanism*

After the can body 52 and partly assembled cover leave the assembly station C, they are brought past an idle station to a mechanism D to clinch the ears 138 about the pintle 55 to complete the hinge. This mechanism is shown in Figs. 1, 14 and 15 and comprises in general a supporting roller for the mandrel and a combined ram or anvil and hinge closer, the action being that of moving the can and cover axially backward along the mandrel 32 so that the partially formed ears are clinched in place by a curling die surface 54 formed on the end of the mandrel.

A slide bar 203 operates through an opening in a bracket 204 extending from the top 35 of the gear housing 36 and carries an anvil 205 at one end. This anvil is held in a slot 206 in the forward end of the bar 203 and has a small amount of motion transversely to the bar, being urged to the left (Figs. 14 and 15) by a spring 207. One end of the anvil is formed with a cam face 208, which engages with a cam face 209 on a portion of the bracket 210 to move the anvil to the right against the pressure of the spring 207, bringing a projection 211 against the outside hinge portion of the can and cover as they are forced axially backward upon the mandrel 32 by the straight front face of the anvil. This backward movement of the body 52 upon the mandrel 32 forces the inwardly projecting cover hinge ear 138 against a rounded recess or die face 54 on the left forward side of the mandrel 32 with the result that the ears 138 are curled and clinched around the pintle 55, thus completing the hinge connection between body and cover. During this operation it is desirable to support the mandrel 32 on its right side as viewed in Fig. 15, and to this end a lever 212, carrying a supporting roller 213, is provided.

The lever 212 is pivoted at 214 to an arm 215 projecting from the slide bar 203. A spring 216 is provided to constantly urge the roller 213 away from the mandrel 32. The other end of the lever carries a roller 217 (Fig. 1) which rides upon a cam 218 fixed on the bracket 204, the spring 216 constantly holding the roller 217 against the cam. As the bar 203 moves to the operative or forward position, shown in Fig. 15, the roller 217 strikes the enlarged portion of the cam 218 and rotates the arm 212 about the pivot 214 against the pressure of the spring 216 to bring the supporting roller 213 against the body 52 on the mandrel 32. As the bar recedes, the roller 217 moves off the enlarged portion of the cam 218 and the spring moves the arm 212 and roller 213 away from the mandrel 32.

Referring to Fig. 1, a slot 219 is cut across and on the under side of the bar 203 in which a block 221 operates, the block being pivoted to a lever 222. The lever 222 is in turn pivoted at 223 to the bracket 204 and is attached to an adjustable link 224 at one end. The link serves to connect the lever 222 to a cam bar 225 which carries cam rollers 226 engaging a periphery cam 227 on opposite points thereof, and forming a part of a crank disc 228 mounted upon the shaft 153. This gives the slide bar 203 a reciprocating movement, whereby the clinching operation is done while the mandrel dwells at the station D.

Positive discharge mechanism

After the can and cover have been completely assembled at station D, the mandrel 32 is carried past another idle station to bring the can to a discharge position at station E where the can is positively ejected from the mandrel by a mechanism that is best shown in Figs. 1 and 18. As the mandrel comes to rest at the station E, fingers 229 formed upon an upstanding portion 231 of an arm 232 extending beneath the mandrel turret engage in the slots 53 (Fig. 16) formed in the mandrel and behind the rear edge of the can and force the can off the mandrel and into a conveyor.

Adjacent and below the upstanding portion 231, the arm 232 carries a cam roller 233 which engages in a cam groove 234 formed in a plate 235 secured to the top 35 of the gear housing 36. The other end of the arm is pivoted by a pin 236 to the crank disc 228 on shaft 153. The action of the disc and cam is so arranged that the fingers are free of the mandrel as they move toward the turret, but are brought into action in the slots 53, as just described, as they move away from the turret and slide the assembled can and cover along the mandrel and into the discharge conveyor.

The conveyor is composed of an endless chain 237 (Fig. 1) carrying lugs 238 spaced apart and adapted to engage behind cans fed to the conveyor, the cans being moved along a suitable track 239. The chain engages a driving sprocket 241 mounted upon a shaft 242 journaled in bearings 243. This shaft is driven by a spiral gear 244 (Fig. 3) meshing with another spiral gear 245 mounted upon the main drive shaft 48.

From the foregoing description it has been seen that the feeding of can bodies from the bodymaker to the turret conveyor 31, the feeding of covers down the chute 62, the transfer of covers from station B to station C, the operation of the clinching mechanism at station D and the operation of the discharge mechanism at station E are all in timed relation with each other and with the auxiliary mechanisms connected with these main mechanisms so that every part of this organized apparatus functions in perfect synchronism with every other part.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for assembling hinge covers to containers, in combination, means to feed and partly pre-form a cover to form hinge members thereon and to position said cover upon a portion of a container body adapted to receive such hinge members in a partially assembled relationship, and a mandrel around which the body may slide, said mandrel having a die for curling hinge elements of the cover.

2. In a machine for assembling hinge covers to containers, in combination, a horn and means for feeding can bodies along said horn, a mandrel rotatable around a center and alignable with said horn to receive around the same can bodies fed along and from said horn, a cover feed and means associated with said cover feed to partly pre-form said covers and to position said hinge covers on said body.

3. In a machine for assembling hinge covers to containers, in combination, a turret body feed having radiating mandrels, a cover feed chute, means associated with said chute to partly pre-form said covers and means for conveying a cover from said chute to meet an advancing mandrel and body thereon to be assembled with said body.

4. In a machine for assembling hinge covers to containers, in combination, a step-by-step turret body feed, said turret having mandrels extending outward from near the center of said turret, a vertically arranged cover feed chute, means associated with said chute to partly pre-form said covers, means for conveying a cover from said chute to one of said mandrels at an assembly station, means at a subsequent station to complete the hinge connection between body and cover, and means for positively ejecting the assembled container.

5. In a machine for assembling hinge covers to containers, in combination, a turret body feed having a series of radially arranged body supporting mandrels and adapted to present a body at successive operating stations arranged around the path of travel of said body feed, and means adapted to convey a cover from the cover feed chute to meet an advancing can body and to be assembled therewith.

6. In a machine for assembling hinge covers to containers, in combination, a body feed, a cover feed, means associated with said cover feed to stop the feeding of can bodies when no cover is present in said cover feed, means for conveying a cover to meet a can body at an assembly station, and means for stopping the feeding of a cover when no can body is presented by said body feed at said station.

7. In combination in a machine for assembling receptacles, each comprising a body and a hinge cover, means to partly form said cover and to partly assemble it upon said body, said means comprising a chute, a finger reciprocating adjacent said chute adapted to move a cover therethrough, die members adjacent a portion of said chute to form hinge members in a said cover, said die members comprising a fixed member and an oscillating member, a device below said chute to receive a cover therefrom and convey it to said body and partly assemble it thereon, said device comprising a second oscillating member, and means for moving a body coincidently with the assembling movement of a cover.

8. In combination in a machine for assembling receptacles, each comprising a body and a hinge cover, means to partly form a said cover and to partly assemble it upon said body, said means comprising a downwardly extending chute, a finger reciprocating adjacent said chute adapted to move a cover therethrough, die members adjacent a portion of said chute to bend hinge members in a said cover, and a device below said chute to receive a cover therefrom and convey it to said body and partly assemble it thereon, said device comprising an oscillating member having a pair of movable fingers therein adapted to releasably engage a cover positioned therebetween, and means for moving a body coincidently with the assembling movement of the cover.

9. In combination in a machine for assembling receptacles, each comprising a body and a hinge cover, means to partly form a said cover and to partly assemble it upon said body, said means comprising a chute, a finger reciprocating adjacent said chute adapted to move a cover therethrough, die members adjacent a portion of said chute to form hinge members in a said cover, a device below said chute to receive a cover therefrom and convey it to said body and partly assemble it thereon, said device comprising an oscillating member, said member having a pair of movable fingers therein adapted to releasably engage a cover positioned therebetween, and a device cooperating with the cover-moving mechanism whereby the feeding of bodies is prevented when no covers are fed to said chute.

10. In combination in a machine for assembling receptacles, each comprising a body and a hinge cover, means to partly form a said cover and to partly assemble it upon said body, said means comprising a chute, a finger reciprocating adjacent said chute adapted to move a cover therethrough, die members adjacent a portion of said chute to bend hinge members in a said cover, a device below said chute to receive a cover therefrom and convey it to said body and partly assemble it thereon, said device comprising an oscillating member, said member having a pair of movable fingers therein adapted to releasably grasp a cover positioned therebetween, and a device cooperating with a cover in said member, and said reciprocating finger adjacent the chute whereby the feeding of covers is prevented when no body is in place to receive a cover.

11. In a machine for assembling hinge covers to containers, in combination, a turret body feed having a series of mandrels having curling die surfaces, a cover feed and means to clinch hinge members on the cover about a pintle fixed in said body, said means comprising means for forcing said hinge members against the curling die surfaces of the mandrels.

12. In a machine for assembling hinge covers to containers, in combination, a revolving turret body feed adapted to carry container bodies past a number of operating stations, means to partially bend the hinge lug blanks of the cover, means to partially assemble a body and a cover at one of said stations, and means to complete the assembly at another of said stations, said assembly means comprising an oscillating means adapted to hold a cover, and mechanism for turning said turning means in time with a part of a rotation of said turret as the cover is applied to a body carried on said turret.

13. In a machine for assembling hinge covers to containers, in combination, an intermittently revolving turret having a series of radially arranged mandrels for carrying the container bodies to and past a series of operating stations, including an assembly station, and means to eject assembled bodies from said mandrels.

14. In a machine for assembling hinge covers to containers, in combination, an intermittently revolving turret having a series of radially arranged mandrels for carrying the container bodies to and past a series of operating stations, including an assembly station, and means to eject assembled bodies from said mandrels, said means comprising fingers having axial movement with respect to said mandrels and engaging within slots cut in said mandrels.

15. In a machine for assembling hinged covers to containers, the combination of a body carrier turret comprising a rotary series of outwardly extending mandrels mounted on said turret, each adapted to receive a body positioned around the mandrel, a feed chute for covers to be hinged to the bodies extending downwardly to near the path of the outer ends of said mandrels, means for bending hinging lugs on the flanges of said covers, a device for holding said covers whereby individual covers coming from said chute are applied successively to the outer ends of said bodies on the mandrels, and mechanism for operating said mandrels and bending means and cover applying means in timed relation.

16. In a machine for assembling hinged covers to containers, the combination of a body carrier turret comprising a rotary series of outwardly extending mandrels on said turret, each adapted to receive a body positioned around the mandrel, means for feeding bodies to said mandrels, a feed chute for covers to be hinged to the bodies extending downwardly to near the path of the outer ends of said mandrels, means for bending hinging lugs on the flanges of said covers, a device for holding said covers having a turning movement corresponding with a part of the rotation of said series of mandrels whereby individual covers are applied successively to the outer ends of said bodies on the mandrels, and mechanism for operating said mandrels and bending means and cover applying means in timed relation.

17. In a machine for assembling hinged covers to containers, the combination of a body carrier turret comprising a rotary series of outwardly extending mandrels on said turret, each adapted to receive a body positioned around the mandrel, a feed chute for covers to be hinged to the bodies extending downwardly to near the path of the outer ends of said mandrels, means for bending hinging lugs on the flanges of said covers, a device for holding said covers having a turning movement corresponding with a part of the rotation of said series of mandrels whereby individual covers are applied successively to the outer ends of said bodies on the mandrels, means for curling the hinging lugs, and mechanism for operating said mandrels and bending means and cover applying means and curling means in timed relation.

18. In a machine for assembling hinged covers to containers, the combination of a body carrier turret comprising a rotary series of outwardly extending mandrels on said turret, each adapted to receive a body positioned around the mandrel, a feed chute for covers to be hinged to the bodies extending downwardly to near the path of the outer ends of said mandrels, means for bending hinging lugs on the flanges of said covers, a device for holding said covers having a turning movement corresponding with a part of the rotation of said series of mandrels whereby individual covers are applied successively to the outer ends of said bodies on the mandrels, means to stop the feeding of can bodies when no cover is present in its proper succession, means for stopping the feeding of a cover when no body is present in its proper succession, and mechanism for operating said mandrels and bending means and cover applying means in timed relation.

19. In a machine for assembling hinged covers to containers, the combination of a body carrier turret comprising a rotary series of outwardly extending mandrels on said turret, each adapted to receive a body positioned around the mandrel, a feed chute for covers to be hinged to the bodies extending downwardly to near the path of the outer ends of said mandrels, means for bending hinging lugs on the flanges of said covers, a device for holding said covers having a turning movement corresponding with a part of the rotation of said series of mandrels whereby individual covers are applied successively to the outer ends of said bodies on the mandrels, means for curling the hinging lugs on the mandrel, means to stop the feeding of can bodies when no cover is present in its proper succession, means for stopping the feeding of a cover when no body is present in its proper succession, and mechanism for operating said mandrels and bending means and cover applying means and curling means in timed relation.

20. In a body and cover assembling machine, the combination, with a body-maker horn, of a rotary series of mandrels, means for bringing said mandrels successively into coincidence with said horn to receive bodies therefrom, and cover-applying means to which the bodies are conveyed by the rotation of the mandrels, for the reception of covers.

21. In a body and cover assembling machine the combination, with a body forming machine, of an intermittently revolving turret having a series of radially extending body holding mandrels, a cover feed and a body and cover assembling station, said mandrels traversing a circular path and being adapted to successively dwell adjacent said body forming machine to receive a body, and adjacent said assembling station to receive a cover for assembly to said body.

22. In a body and cover hinging machine, the combination with a body forming machine, of an intermittently revolving turret having a series of radially extending body holding mandrels, a cover feed and a body and cover hinging mechanism, each of said mandrels being of the shape of a body held thereon and having a hinge forming die and being adapted to successively move with said turret in a circular path in alignment with said body forming machine to receive a body and in alignment with said mechanism to co-operatively assemble a cover to said body.

23. In a body and cover hinging machine, the combination with a body forming machine, of an intermittently revolving turret having a series of radially extending body holding mandrels, each of said mandrels having substantially the shape of the body to be held and also having a hinge forming die, a body and cover assembling mechanism, a cover feed and cover hinge forming mechanism adapted to form a hinge part on said cover and feed the same to said assembling mechanism, said mandrels traversing a circular path and being adapted to successively dwell adjacent said body forming mechanism to receive a body and adjacent said assembling mechanism to receive and cooperatively assemble a cover to said body.

24. In a body and cover assembling machine, the combination with a body forming machine, of an intermittently revolving turret having a series of radially extending body holding mandrels, a cover feed and a body and cover assembling station, said mandrels traversing a circular path and being adapted to dwell adjacent said body to receive a body and adjacent said assembling station to receive a cover, and means associated with said cover feed to prevent the feeding of a body from said body forming machine when no cover is present in said cover feed.

25. In a body and cover assembling machine, the combination with a body forming machine, of an intermittently revolving turret having a series of radially extending body holding mandrels, a cover feed and a body and cover assembling station, said mandrels traversing a circular path and being adapted to dwell adjacent said body forming machine to receive a body and adjacent said assembling station to receive a cover, and means for preventing the feeding of a cover to said station in the absence of a body upon said mandrel.

JOHN M. HOTHERSALL.